US006985266B2

(12) United States Patent
Heno et al.

(10) Patent No.: US 6,985,266 B2
(45) Date of Patent: Jan. 10, 2006

(54) PRINTER OF A NEW TYPE

(75) Inventors: Gaëtan Heno, Ancenis (FR); Michaël Hinry, Pouance (FR)

(73) Assignee: ZIH Corp., Hamilton (BM)

( * ) Notice: Subject to any disclaimer, the term of this patent is extended or adjusted under 35 U.S.C. 154(b) by 901 days.

(21) Appl. No.: 09/842,052

(22) Filed: Apr. 26, 2001

(65) Prior Publication Data

US 2002/0158399 A1 Oct. 31, 2002

(51) Int. Cl.
*H04N 1/36* (2006.01)

(52) U.S. Cl. ...................... 358/409; 358/410; 358/411; 358/412

(58) Field of Classification Search ................. 358/1.3, 358/1.1–1.2; 271/114, 118–119; 400/636
See application file for complete search history.

(56) References Cited

U.S. PATENT DOCUMENTS 4,795,145 A 1/1989 Fuller
5,358,230 A * 10/1994 Ikemori et al. ............. 271/114

FOREIGN PATENT DOCUMENTS

| | | |
|---|---|---|
| EP | 0 418 515 | 3/1991 |
| EP | 0 567 112 | 10/1993 |

* cited by examiner

*Primary Examiner*—Twyler Lamb
(74) *Attorney, Agent, or Firm*—Alston & Bird LLP

(57) ABSTRACT

A printer comprises, from upstream to downstream, a loader for articles to be printed, a printing device and transfer elements to direct sequentially the articles from the outlet of the loader to the printing device and from the printing device toward collection elements for the printed articles. The outlet drive element for the articles from the loader, has a cylinder in contact with the articles to be printed by an opening provided in a wall of the loader, and is moved by a motor common to the transfer elements. The contact between the cylinder and the articles is sequentially interrupted by an isolating device moved by a mechanical connection with the motor of the printing device.

26 Claims, 5 Drawing Sheets

PRINTER OF A NEW TYPE

The present invention relates to a printer for printing, preferably by thermal transfer, of articles such as cards, in particular of plastic material.

It relates more particularly to a printer of the type comprising, from upstream to downstream, a loader for articles to be printed, adapted to coact with a motor element for articles leaving the loader, a printing device and transfer means to conduct sequentially the articles from the loader outlet to the printing device and from the printing device to means to collect the printed articles.

Such printers are well known to those skilled in the art. Until now, the ejection of a card contained in the loader in the direction of the printer takes place as follows. The loader is constituted by a casing connected to one of the surfaces of the frame of the printer. This casing comprises, in its rear wall, an opening. The stacked cards within the loader are maintained in bearing relation against the bottom of the casing by a weight. A cylinder projects partially through the opening and comes to bear against said cards. This cylinder is driven in rotation by a motor to give rise, by friction, to the movement of a card out of the casing of the loader. This motor is stopped upon the card leaving, which is then driven in movement within the printer by transport rollers driven in rotation by means of a second motor. A printing device, disposed within the printer, is itself controlled in operation by means of a third motor. The design of the printer thus requires arranging on the one hand a motor dedicated solely to the operation of the expulsion cylinder for the cards from the loader, and on the other hand a motor dedicated to the operation of the transport rollers.

An object of the present invention is to provide a printer of the type mentioned above whose design permits omitting one motor in comparison to the conventional printers known until now, without impeding the operation of the printer.

To this end, the invention has for its object a printer for printing, preferably by thermal transfer, of articles such as cards, in particular of plastic material, of the type comprising, from upstream to downstream, a loader of articles to be printed, adapted to coact with a motor element for the outlet of articles from the loader, a printing device and a transfer means to lead articles sequentially from the outlet of the loader to the printing device and from the printing device to means to collect the printed articles, characterized in that the motor element for articles leaving the loader, constituted by a cylinder in contact with the articles to be printed by means of an opening provided in a wall of the loader, is moved by a motor common to the transfer means, a contact between the loading cylinder and the articles to be printed being sequentially interrupted by an isolating device displaced by a mechanical connection with the motor of the printing device.

Thanks to the presence of the isolating device between the rotating cylinder of the loader and the article contained in the loader, the cylinder of the loader can be driven in rotation, including during a printing cycle, without causing the outlet of a fresh card from the loader.

The invention will be better understood from a reading of the following description of embodiments, with reference to the accompanying drawings, in which.

Figure 1:
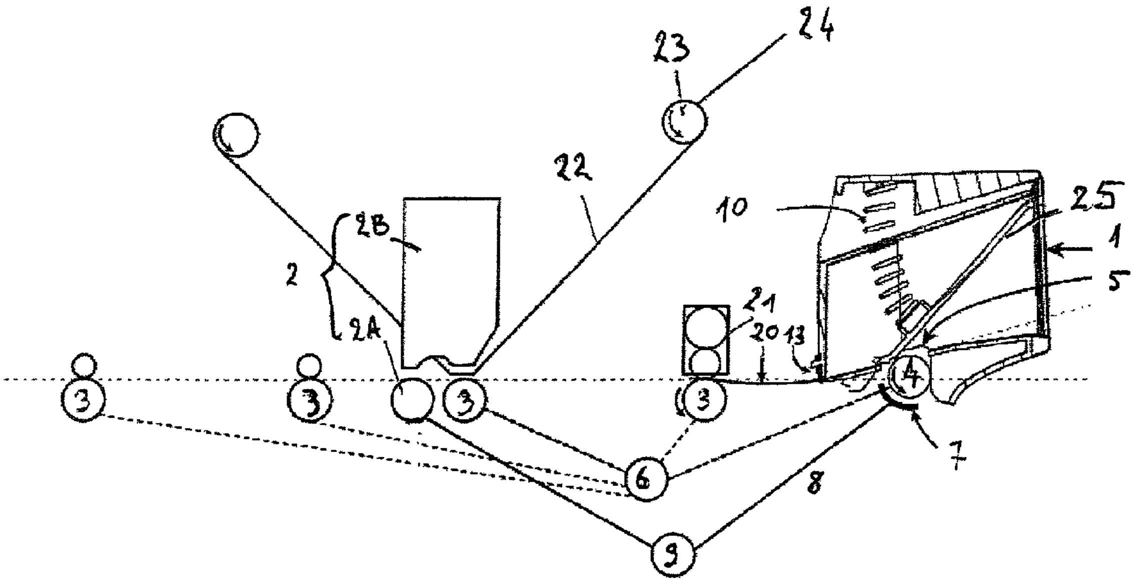
FIG. 1 is a schematic view of a printer according to the invention.

The printer which is the object of the invention is more particularly adapted for printing, preferably by thermal transfer, of articles 20 such as cards, in particular of plastic material.

This printer comprises, in a known manner, from upstream to downstream, a loader 1 for articles 20 to be printed adapted to coact with a motor element for removing the articles 20 from the loader 1, a printing device 2 and transfer means 3 to conduct sequentially the articles 20 from the outlet of the loader 1 to the printing device 2 and from the printing device 2 to the collection means for the printed articles. These collection means (not shown) can be constituted particularly by a collection bin disposed on the introduction side of the card into the printer or on the opposite side of the printer. A cleaning device 21 can also be interposed between the printing device 2 and the outlet 18 of the loader. This cleaning device 21 can be constituted by at least one cleaning roller disposed parallel to and below a rotating roller 3 constituting one of the elements of the transfer means. The card 20 to be printed comes from the outlet of the loader to be disposed between said rollers delimiting a pinching region and is driven by means of the rotating roller 3 coacting with the cleaning roller in the direction of the printing device 2. In the course of this passage between said rollers, dirt covering the card 20 is eliminated by an appearance of the dirt to the cleaning roller. The card proceeds to move along the transport path delimited by the transfer means 3 to come to the printing device 2. In the example shown in FIG. 1, the card 20 is moved by transfer means 3 beyond the printing device 2 and then is returned below the head 2B of the printing device there to be printed before being extracted from the body of the printer by the transfer means 3.

In this printer, the loader 1 is constituted by a casing generally fixed removably on one of the surfaces of the body of the frame of the printer. This casing comprises an opening 5 provided in one of its walls, in this instance the bottom wall of the loader 1. The cards 20 to be printed are maintained within the loader 1 bearing against the wall having this opening 5. The exit of the cards 20 from the loader is achieved by means of a motor element constituted by a cylinder 4 rotating in contact with the cards 20 to be printed, through the opening 5. Driving in rotation of this cylinder 4 gives rise, by frictional contact with a card 20 held bearing against the wall of the loader 1, to the exit of this card through a slot 18 of the loader 1. This card 20 is then driven, by means of the transfer means 3 which will be described hereafter, to the interior of the printer to be printed.

In a manner characteristic of the invention, and as shown in the drawings, the cylinder 4, constituting the drive element for the cards 20 from the loader, is moved by a motor 6 common to the transfer means 3. In the illustrated examples, these transfer means 3 are constituted by pairs of cylinders or parallel rotating rollers disposed along the path of movement and of transport of the card 20 within the printer. Each pair of rollers delimits a pinching region for the card 20 driven by friction upon driving in rotation one of the rollers of the pair, the other roller being adapted to be freely mounted in rotation. The connection between motor 6, transverse cylinders 3 and drive cylinder 5 for loading, can be obtained by means of an endless transmission such as a belt transmission.

To prevent continuous supply of the cards 20 contained in the loader in the direction of the printer, the contact between cylinder 4 of loader 1 and articles 20 to be printed is sequentially interrupted by an isolating device 7 which will be described in greater detail hereafter. This isolating device 7 is moved by a mechanical connection 8 with the motor 9 of the printing device 2.

In the illustrated examples, the loader 1 comprises means 10 returning, preferably resiliently, the articles 20 to be printed in the direction of the opening 5 of the loader 1 to bring them into bearing contact with the drive cylinder 4 of the loader 1. In the example shown in FIG. 1, the return means 10 are constituted by a spring returning a pivoting flap 25 disposed within the loader 1 bearing against the top of the pile of cards 20. The isolating device 7 comprises itself means 11A, 11B bearing sequentially against said articles 20 to move them against the return means 10 to as to prevent any contact between articles 10 and drive cylinder 4 of the loader 1. Thus, the isolating device 7 tends, in the illustrated examples, to raise the cards 20 contained within the loader 1 when they occupy an active position corresponding to a position bearing against the drive cylinder 4.

In a particular manner, this isolating device 7 is formed by a cage 11 partially surrounding the drive cylinder 4 of the loader 1 by means of a discontinuous peripheral wall. In the illustrated examples, the discontinuous peripheral wall of the cage is shaped to delimit at least two bars 11A, 11B, at least one of said bars 11A, 11B being adapted, in a first active angular position of the cage, to isolate the articles 20 to be printed from the drive cylinder 4 of the loader 1 turning freely within the cage 11 and, in a second inactive angular position of the cage, to withdraw so as to permit, in the space between the bars 11A, 11B, a contact between article 20 and cylinder 4.

Figure 3:
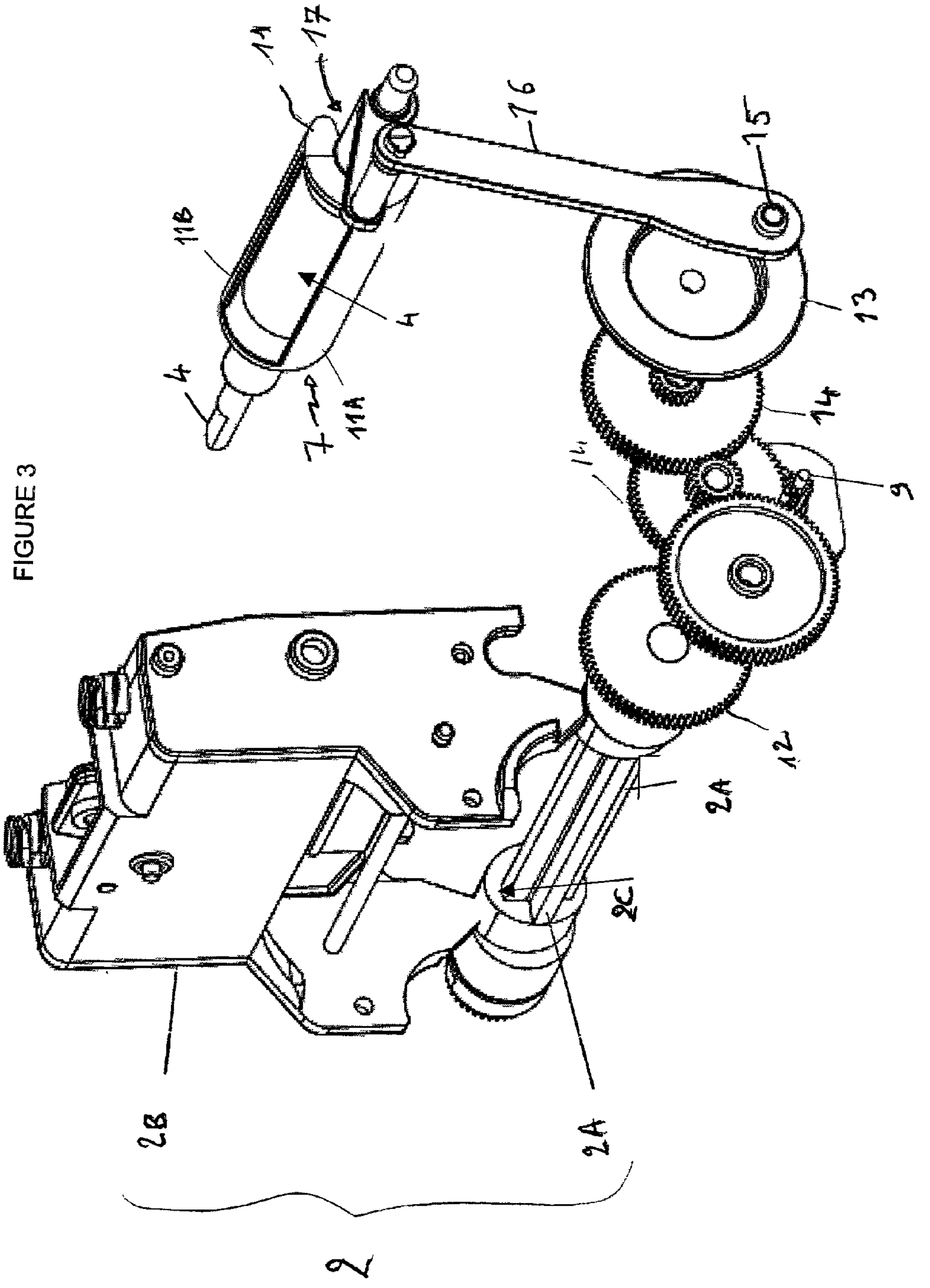
FIG. 3 is a schematic view of the connection between the printing device and the isolating device in a so-called article loading position.
Figure 4:
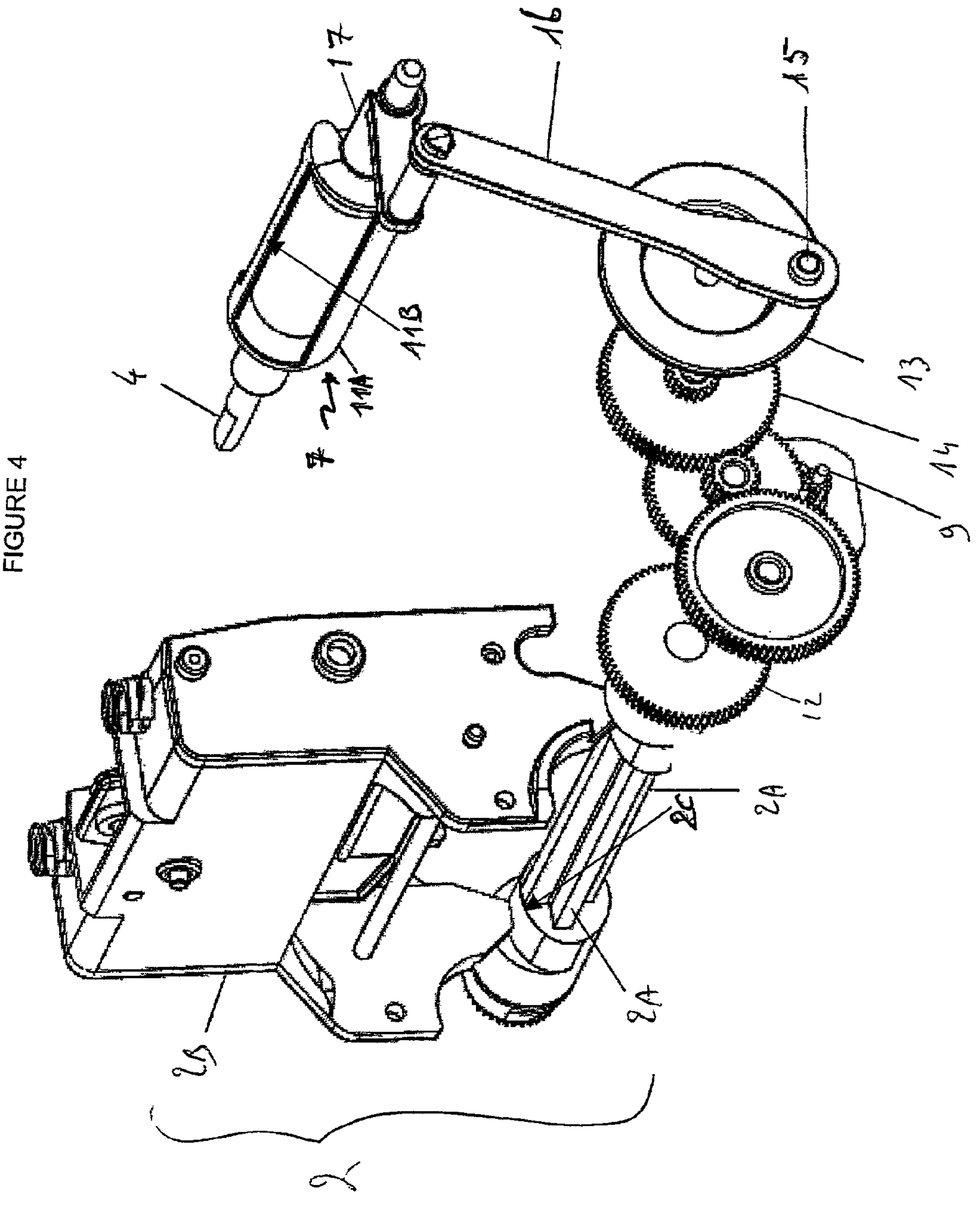
FIG. 4 is a schematic perspective view of the connection between the printing device and the isolating device in a printing position of an article.
Figure 5:
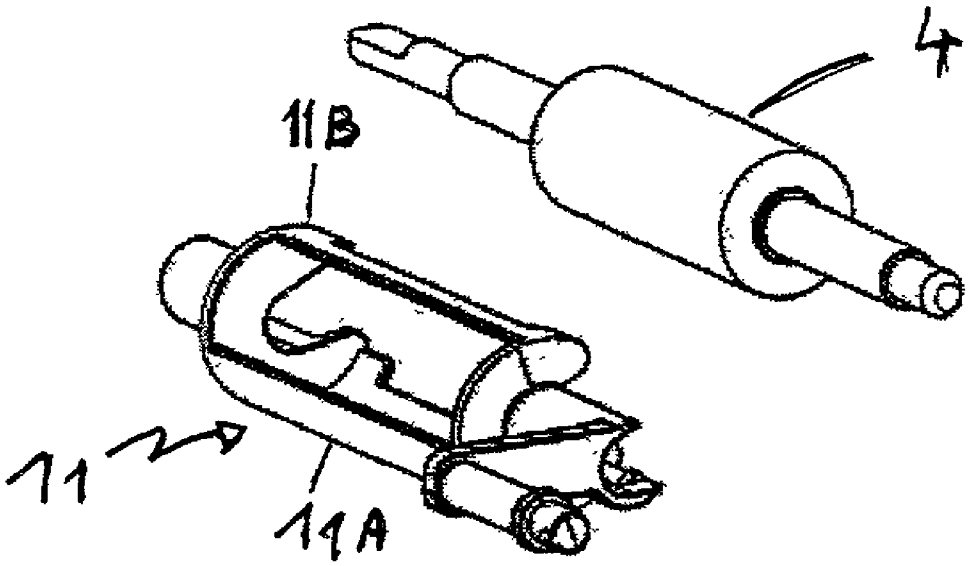
FIG. 5 is a schematic perspective view of the insulating device and of the loading cylinder in an exploded position of the elements.

Each bar thus has the shape of a curved wall moving about a circle passing through the axis of rotation of the cylinder 4 of the loader. These bars 11A, 11B are so constructed as partially to enclose the cylinder 4 so as to provide in the space between the bars one or several openings through which the cylinder 4 can come into contact with the article 20, such as a card, stored within the loader 1. The cage 11 thus defined can occupy at least a first angular position, so-called active, in which at least a portion of the wall, such as a bar, in this case the bar 11A, isolates the articles to be printed from the freely turning drive cylinder 4 of the loader 1. This first position is more particularly shown in FIGS. 2 and 4. This cage 11 can also occupy at least one second angular position, so-called inactive position, in which the wall or respectively the bars 11A, 11B are retracted to permit contact between the article and the cylinder 4, as shown in FIG. 3. Clearly, each time, the angular movements of this cage 11 are controlled by a motor 9 common to the printing device 2.

The printing device 2 is itself constituted by at least one shaft 2A with cams 2C on which bears a printing head 2B driven with an up and down movement during angular movement of the shaft 2A to move between an upper inactive position and a lower active position, the angular movement of said shaft 2A being synchronized with the angular movement of the cage 11 so as to define at least two positions, one so-called loading position in which the printing head 2B and the cage 11 are in inactive position and a fresh article 20 is driven from the loader, the other, so-called printing position, in which printing head 2B and cage 11 are in the active position to avoid any drive of a fresh article during the printing sequence. The printing head 2B will not be described in greater detail because it is well known to those skilled in this art.

Figure 2:
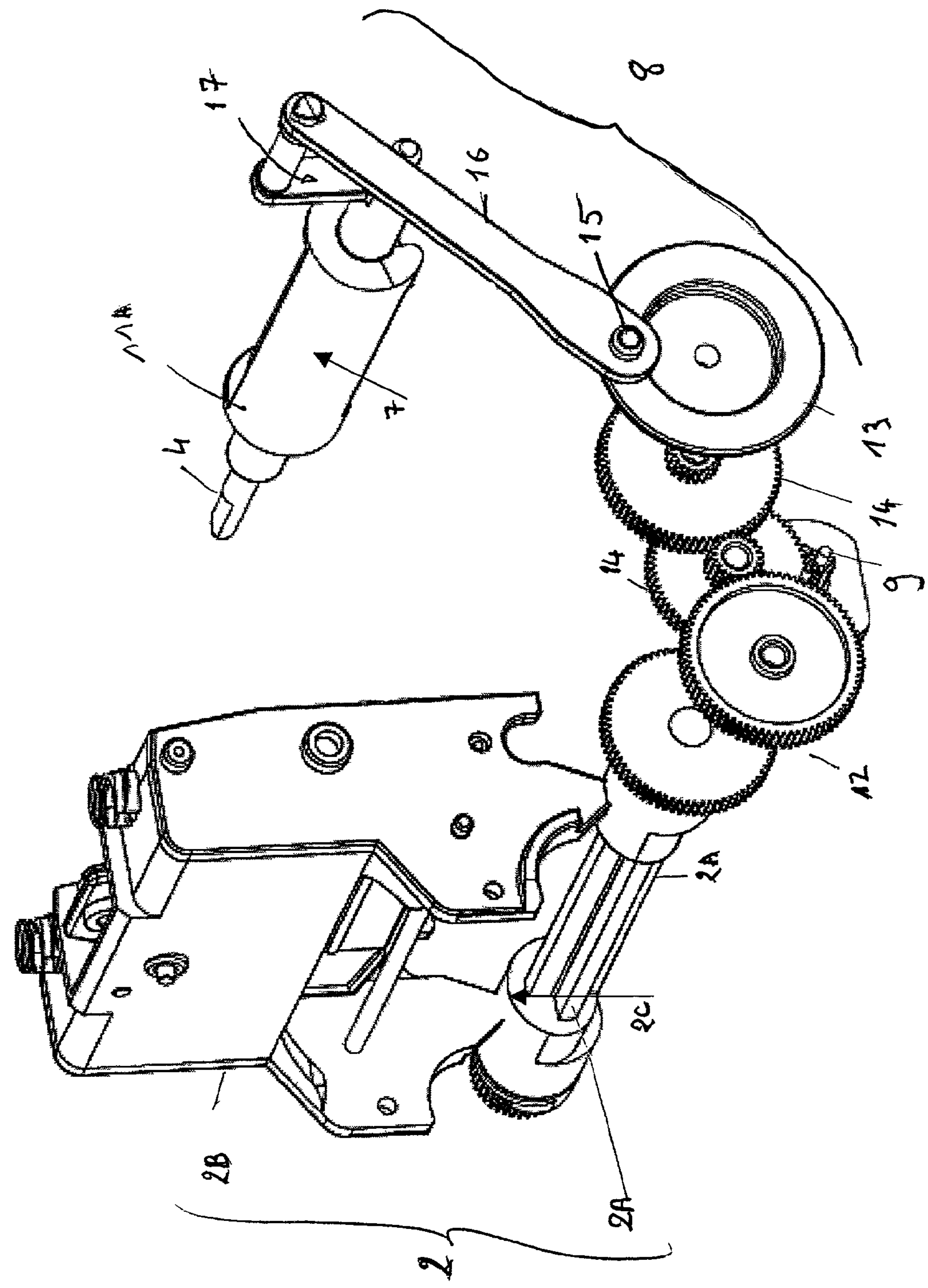
FIG. 2 is a schematic perspective view of the mechanical connection between the printing device and the isolating device in so-called initial position.

This printing head 2B is generally mounted within a support as shown in FIG. 2.

The cage 11 and the shaft 2A with a cam can occupy at least a third position intermediate the first and second positions, in which the cage 11 is in an active position whilst the printing head 2B is in an inactive position. This position is more particularly shown in FIG. 2. The passage from one angular position to another of the isolation device on the one hand and of the shaft 2A with cams 2C of the printing device on the other hand, is obtained by means of a single motor 9. The isolation device 7 is connected to this motor 9 by a mechanical connection 8 constituted by a device of the crank type comprising a rotatable flywheel 13 connected to the motor 9 by a reducing mechanism 14, this flywheel 13 with an eccentric crank pin 15 receiving a rod 16 connected to the cage 11 by a crank arm 17 so as to give rise, during actuation of the motor 9, to an angular displacement of the cage 11. At least a portion of this reducing mechanism 14, disposed between the crank and the motor 9 of the printing device 2, is common to the drive mechanism 12 of the printing device 2. Thus, the shaft 2A with cams 2C of the printing device 2 is connected by a reducing mechanism 12 with pinions to the motor 9 controlling the operation of the isolating device 7.

The motor 9 of the printing device 2 is reversible in direction. There is thus obtained a succession of positions as follows. In a first instance, isolating device 7 and printing device 2 occupy an inactive position as shown in FIG. 2. This position is called the initial position or intermediate position. In this initial position the bar 11A of the cage is disposed in a position in which it isolates the cards 20 contained in the loader 1 of the drive cylinder 4 adapted to be driven in rotation by a motor 6 common to the transport rollers 3. The printing head 2B is itself maintained in an upper or inactive position by means of cams 4C on the camshaft 2A. When a card 20 is to be expelled from the loader, the motor 9, common to the isolating device 7 and to the printing device 2, is driven in rotation so as to drive the cage 11 of the isolating device 7 to the left from the position shown in FIG. 2. The printing device and the isolating device then occupy a so-called loading position, shown in FIG. 3. In this position, again, the printing device is in the inactive position, thanks to the positioning of the cams 2C on the camshaft 2A, whilst the bar 11A of the cage 7 has been moved to permit the cylinder 4 to come, because of the free space between bars 11A and 11B, into contact with the cards 20 disposed in the loader. This position thus corresponds to an outlet position for a card 20 from the loader 1 by bearing contact against cylinder 4 and the card is disposed against the bottom of the loader 1. Upon the exit of the card 20 from the loader 1, the printing device 2 and the isolating device 7 return to the position shown in FIG. 2 by reversal of the direction of rotation of the motor. The card then pursues its path within the printer by means of the transport rollers 3 as shown in FIG. 1, until it extends beyond the printing device 2. In this position, the transfer means 3 are stopped in rotation and the shaft 2A with cams 2C and the cage 11 are driven in a direction of rotation corresponding to a rotation toward the left of the cage 11 to bring the printing head 2B into the lower or active position and to permit the isolating device 7 to maintain an isolation between cards 20 contained in the motor 1 and cylinder 4 by means of the bar 11B. In this printing position, the card is printed by coaction of the printing head 2B with an impression film 22 shown in FIG. 1, in a manner known per se. This film 22 can then be wound on the rollers 23, the so-called printing rollers. These printing rollers 23 can be motor-driven independently in the case of a polychrome printing process or be driven in a manner coupled with the motor 9 of the printing device in the case of a monochrome arrangement. A motor 24 corresponding to a polychrome arrangement is shown in FIG. 1.

Once printing is finished, the printing device 2 and the isolating device 7 are brought back to the initial position corresponding to FIG. 2 and the printed card follows its path to the collection means (not shown) for the cards, this movement being obtained by means of the transport rollers 3.

Thanks to the presence of the isolating device 7 and the coupling of this isolating device 7 to the motor 9 controlling the printing device 2, it is possible to drive in rotation the drive cylinder 4 controlling the exit of the cards from the motor 1, including during the printing step, such that this rotatable cylinder 4 can be coupled to the transport rollers 3 and be controlled in operation by a single motor 6 acting in parallel on the transport rollers 3. There results a simplification of the obtained printing.

It is to be noted that, in the illustrated examples, that the isolating device 7 is mounted by snapping on to the shaft of the cylinder 4 of the loader 1. There results a rapidity and simplification of mounting. To this end, the end walls of the cage 11 adjoining the peripheral wall of the cage are shaped to provide bearings in which will be disposed the shaft carrying the rotatable drive cylinder 4 of the loader 1.

What is claimed is:

1. A printer for printing, preferably by thermal transfer, of articles (20) such as cards, in particular of plastic material, of the type comprising, from upstream to downstream, a loader (1) for articles to be printed, adapted to coact with a drive element for emitting articles (20) from the loader (1), a printing device (2) and transfer means (3) to bring sequentially the articles (20) from the outlet (18) of the loader (1) to the printing device (2) and from the printing device (2) toward collection means for the printed articles (20), characterized in that the drive element for bringing articles (20) from the loader (1), constituted by a cylinder (4) in contact with the articles (20) to be treated by means of an opening (5) provided in a wall of the loader (1), is driven by a motor (6) common to the transfer means (3), the contact between the cylinder (4) of the loader (1) and the articles (20) to be treated being sequentially interrupted by an isolating device (7), said isolating device coupled to and actuated by the motor (9) of the printing device (2) by a mechanical connection (8).

2. A printer according to claim 1, characterized in that the loader (1) comprises return means (10), preferably resilient, for the articles (20) to be printed in the direction of the opening (5) of the loader (1) to bring them into bearing contact with the drive cylinder (4) of said loader (1), the isolating device (7) comprising means (11A, 11B) bearing sequentially against said articles (20) to move them against the return means (10) so as to prevent any contact between the articles (20) and the drive cylinder (4) of the loader (1).

3. A printer according to claim 1, characterized in that the isolating device (7) is comprised by a cage (11) partially enveloping the drive cylinder (4) of the loader (1) by means of a discontinuous peripheral wall, this cage (11) being adapted to occupy at least one first angular position, called an active position, in which at least one portion of the wall isolates the articles to be printed from the drive cylinder (4) of the rotor (1) turning freely and at least one second angular position, a so-called inactive position, in which the wall retracts to permit contact between the article and the cylinder (4), the angular movements of this cage (11) being controlled by a motor (9) common to the printing device (2).

4. A printer according to claim 3, characterized in that the discontinuous peripheral wall of the cage is shaped to delimit at least two bars (11A, 11B), at least one of said bars (11A, 11B) being adapted, in a first active angular position of the cage, to isolate the articles (20) to be printed from the drive cylinder (4) of the loader (1) turning freely within the cage (11) and, in a second inactive angular position of the cage, to retract to permit, in the space between the bars (11A, 11B), a contact of the article (11) with the cylinder (4).

5. A printer according to claim 3, characterized in that the printing device (2) is constituted by at least one shaft (2A) with cams (2C) on which bears a printing head (2B) driven with up and down movement upon angular displacement of said shaft (2A) to move between an upper inactive position and a lower active position, the angular movement of said shaft (2A) being synchronized with the angular displacement of the cage (11) so as to define at least two positions, a so-called loading position in which the printing head (2B) and the cage (11) are in inactive position and a fresh article (20) is driven from the loader, and the other, so-called printing position, in which the printing head (2B) and the cage (11) are in an active position to avoid any driving of a fresh article during the printing process.

6. A printer according to claim 5, characterized in that the cage (11) and the shaft (2A) with cams (2C) occupy at least a third position intermediate between the first and second positions, in which the cage (11) is in active position whilst the printing head (2B) is in inactive position.

7. A printer according to claim 1, characterized in that the isolating device (7) is mounted by snapping into the shaft of the cylinder (4) of the loader (1).

8. A printer according to claim 1, characterized in that the isolating device (7) constituted by a cage (11) partially enveloping the drive cylinder (4) of the loader (1), is connected to the motor (9) of the printing device (2) by a mechanical connection (8) constituted by a crank type device comprising a rotatable flywheel (13) connected to the motor (9) by a reducing mechanism (14), this flywheel (13) with an eccentric crank pin (15) receiving a rod (16) connected to the cage (11) by a crank arm (17) so as to give rise, during actuation of the motor (9), to an angular movement of the cage (11).

9. A printer according to claim 8, characterized in that at least a portion of the reducing mechanism (14) disposed between the crank and the motor (9) of the printing device (2), is common to the drive mechanism (12) of the printing device (2).

10. A printer according to claim 1, characterized in that the motor (9) of the printing device (2) is reversible in direction of rotation.

11. A printer for printing on media units comprising:

a loader comprising media units to be printed;

a first drive element for removing media units from said loader;

an isolating device adjacent to said first drive element for interrupting contact between said first drive element and the media units in said loader; and a motor coupled to both said first drive element and said isolating element for actuating said first drive element to remove media units from said loader and further actuates and drives said isolating device to move to a position wherein said isolating device interrupts contact between said first drive element and the media units in said loader to thereby selectively input a media unit in the print path of the printer.

12. A printer according to claim 11, further comprising a second drive element for transferring the media units along the print path, wherein said motor is connected to all of said first and second drive elements and said isolating element, such that said motor drives each of said elements.

13. A printer according to claim 11, wherein said first drive element comprises a cylinder rotated by said motor, wherein the surface of the cylinder contacts the media units and transfers the media units from said loader to the print path when rotated.

14. A printer according to claim 11, wherein said isolating device comprises an enclosure defined by a wall and an opening in said wall, wherein said first drive element is located in said enclosure, wherein in a first position, said wall of said enclosure of said isolating device isolates said first drive element from the media units and in a second position, said opening of said enclosure allows said first drive element to contact the media units in said loader.

15. A printer according to claim 11, wherein said isolating device is coupled to said motor via a reducing mechanism.

16. A printer according to claim 11 further comprising return means located in said loader for contacting said media units and urging said media units against said first drive element.

17. A printer according to claim 11 further comprising:

a flap pivotally connected to said loader, and a spring for biasing said flap, wherein said flap contacts said media units and urges said media units against said first drive element.

18. A printer according to claim 11 further comprising a print head that is capable of being positioned in either an active position for printing or an inactive position, wherein the positioning of said print head is coordinated with said isolation device, such that when said print head is in an active position, said isolating device moves to a position wherein said isolating device interrupts contact between said first drive element and the media units in said loader and when said print head is in an inactive position, said isolating device moves to a position to allow said first drive element to contact a media unit in said loader and provide the media units to the print path of the printer.

19. A printer according to claim 11 further comprising a crank mechanism connecting said isolating device to said motor of said printer, said crank mechanism comprising:

a reducing mechanism connected to said motor;

a rotatable flywheel connected to said reducing mechanism;

an eccentric crank pin located on said flywheel; and a rod connected to said crank pin and to said isolation device.

20. A printer for printing on media units comprising:

a loader comprising media units to be printed;

a first drive element for removing media units from said loader; and an isolating device adjacent to said first drive element for interrupting contact between said first drive element and the media units in said loader, wherein said first drive element is located in said isolating device, wherein in a first position, said isolating device isolates said first drive element from the media units and in a second position, said isolating device allows said first drive element to contact the media units in said loader.

21. A printer according to claim 20, wherein said isolating device comprises an enclosure defined by a wall and an opening in said wall, wherein said first drive element is located in said enclosure, wherein in the first position, said wall of said enclosure of said isolating device isolates said first drive element from the media units and in the second position, said opening of said enclosure allows said first drive element to contact the media units in said loader.

22. A printer according to claim 20 further comprising a motor coupled to both said first drive element and said isolating element for actuating said first drive element to remove media units from said loader and further actuates and drives said isolating device to move to a position wherein said isolating device interrupts contact between said first drive element and the media units in said loader to thereby selectively input a media unit in the print path of the printer.

23. A printer according to claim 22, further comprising a second drive element for transferring the media units along the print path, wherein said motor is connected to all of said first and second drive elements and said isolating element, such that said motor drives each of said elements.

24. A printer according to claim 20, wherein said first drive element comprises a cylinder rotated by said motor, wherein the surface of the cylinder contacts the media units and transfers the media units from said loader to the print path when rotated.

25. A printer for printing on media units comprising:

a loader comprising media units to be printed;

a first drive element for removing media units from said loader;

an isolating device comprises an enclosure defined by a wall and an opening in said wall, wherein said first drive element is located in said enclosure, wherein in the first position, said wall of said enclosure of said isolating device isolates said first drive element from the media units and in the second position, said opening of said enclosure allows said first drive element to contact the media units in said loader; and a motor coupled to said isolating element far actuating said isolating device to move to a position wherein said isolating device interrupts contact between said first drive element and the media units in said loader to thereby selectively input a media unit in the print pat of the printer, wherein said isolating device is coupled to said motor by a linkage, such that the isolation device moves any time the motor rotates.

26. A printer according to claim 25, wherein the linkage between said motor and said isolation device is a crank mechanism comprising:

a reducing mechanism connected to said motor, a rotatable flywheel connected to said reducing mechanism;

an eccentric crank pin located on said flywheel; and a rod connected to said crank pin and to said isolation device.

* * * * *

UNITED STATES PATENT AND TRADEMARK OFFICE

CERTIFICATE OF CORRECTION

PATENT NO. : 6,985,266 B2 
DATED : January 10, 2006
INVENTOR(S) : Heno et al.

It is certified that error appears in the above-identified patent and that said Letters Patent is hereby corrected as shown below:

<u>Column 6,</u>
Line 22, “shalt” should read -- shaft --.

Signed and Sealed this

Sixteenth Day of May, 2006

JON W. DUDAS
*Director of the United States Patent and Trademark Office*